(No Model.)  5 Sheets—Sheet 5.

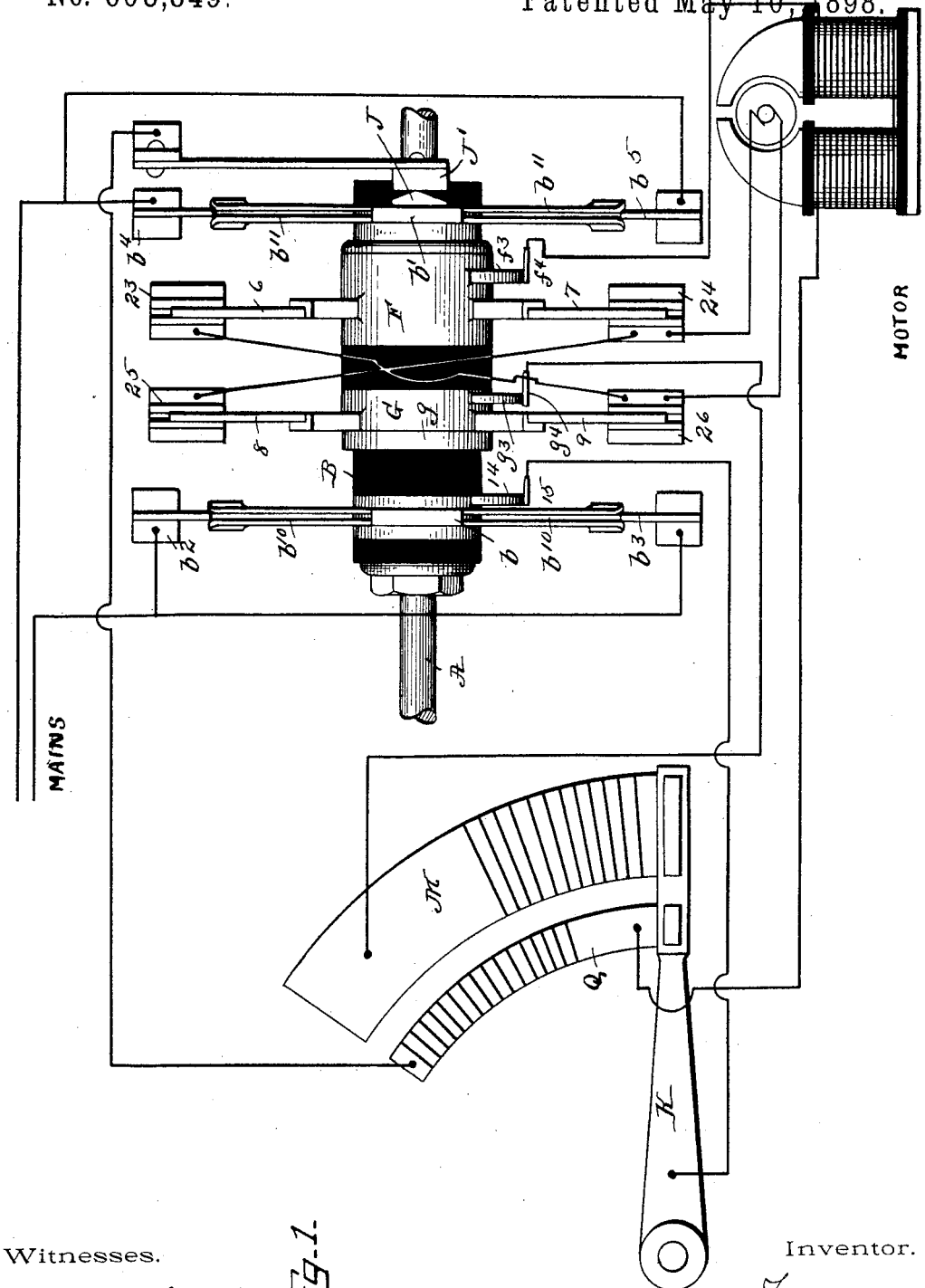

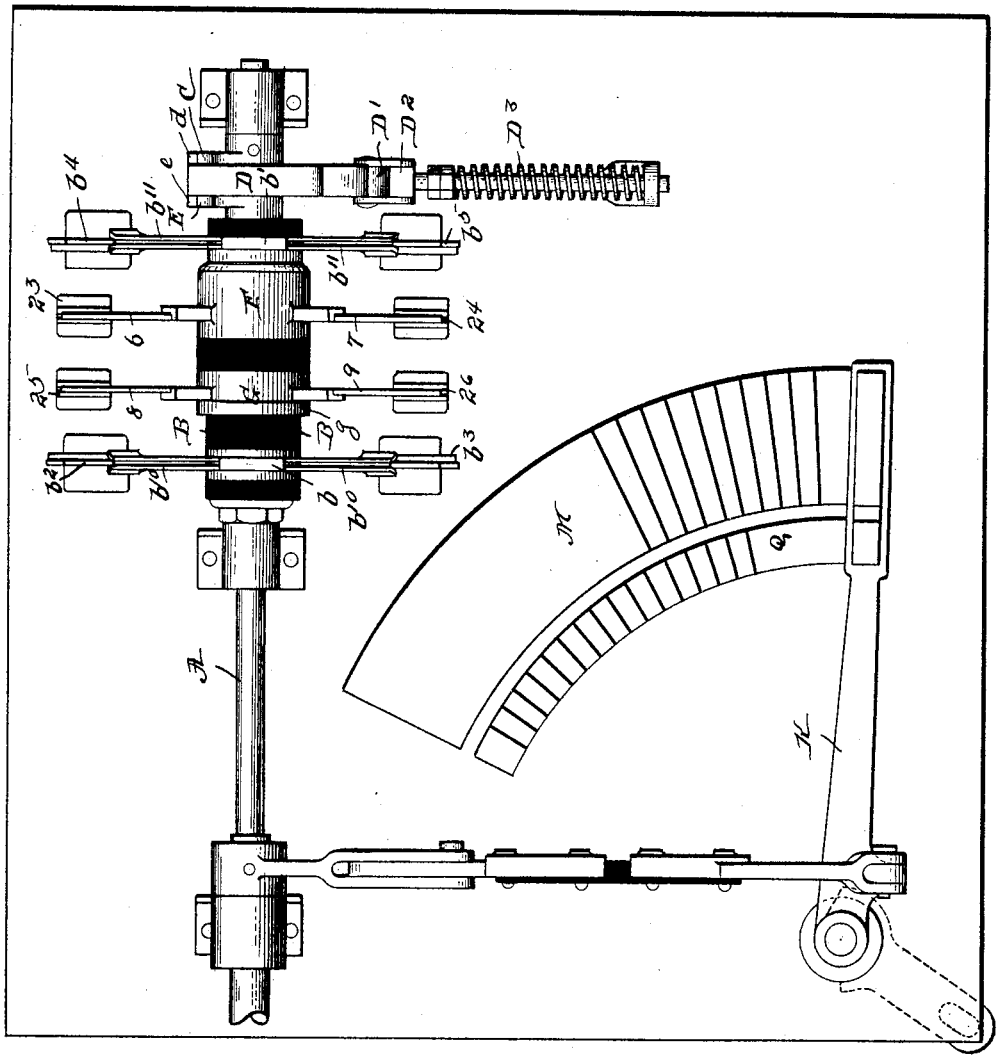

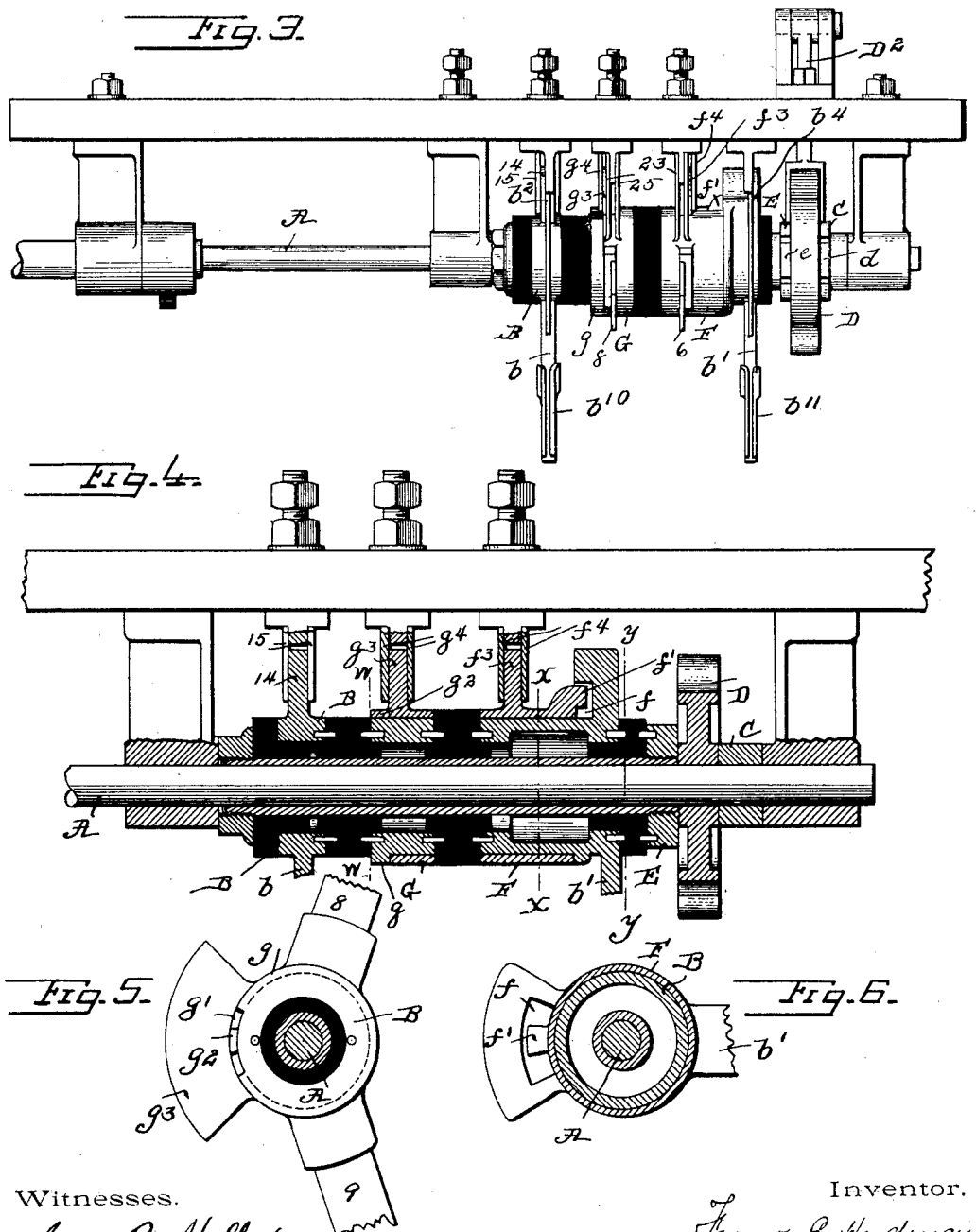

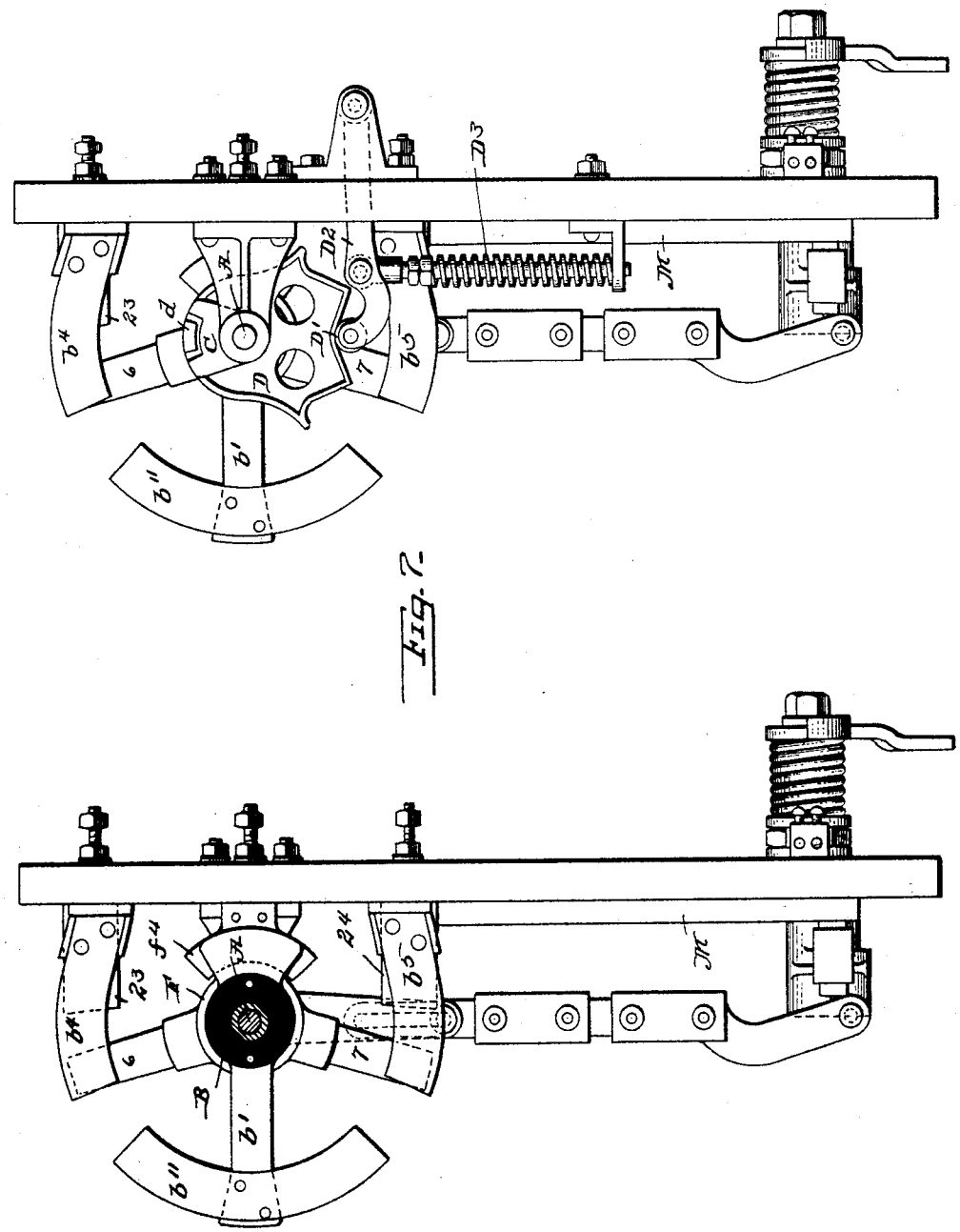

F. E. HERDMAN.
SWITCH FOR ELECTRIC MOTORS.

No. 603,849.  Patented May 10, 1898.

Witnesses.  Inventor.
Frank E. Herdman
Attorney.

UNITED STATES PATENT OFFICE.

FRANK E. HERDMAN, OF WINNETKA, ILLINOIS.

SWITCH FOR ELECTRIC MOTORS.

SPECIFICATION forming part of Letters Patent No. 603,849, dated May 10, 1898.

Application filed January 9, 1897. Serial No. 618,513. (No model.)

*To all whom it may concern:*

Be it known that I, FRANK E. HERDMAN, a citizen of the United States, residing at Winnetka, county of Cook, and State of Illinois, have invented a new and useful Improvement in Switches for Electric Motors, of which the following is a full, clear, and exact description, reference being had to the accompanying drawings, which form a part of this specification.

The object of my invention is to provide a switch for an electric motor which will prevent sparking of the fields and also prevent sparking from opening outside circuit; also, a switch which will snap close as well as open. To that end, speaking generally, I provide a construction of switch in which when the connection is made with the source of current-supply the field and armature of the motor are both in circuit with the source of current-supply and when the switch is operated to cut off connection with the source of current-supply a closed circuit is maintained, including the field and the armature. I further provide an auxiliary contact device for maintaining a closed circuit through the field, this latter device being especially adapted for use with reversing motors where the current to the armature is reversed. I also have provided a construction of switch which is novel in its general application and also in its application to the specific purposes above recited.

I will first describe the embodiment of my invention as illustrated in the accompanying drawings, in which—

Figure 9:
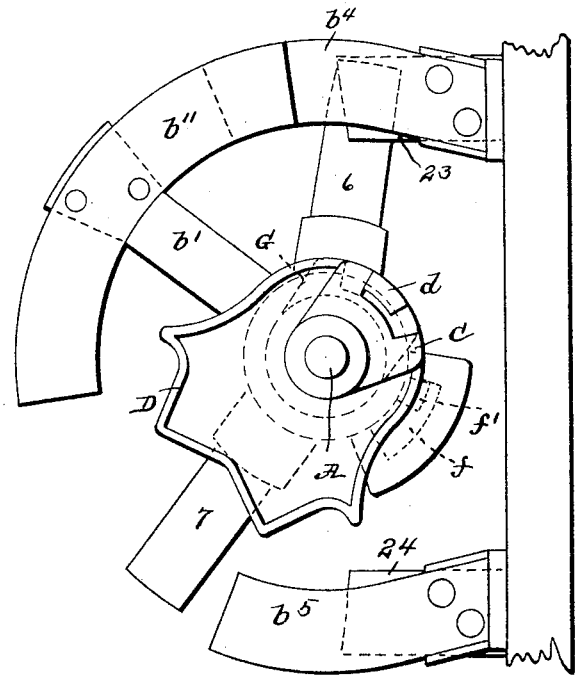
Figure 10:
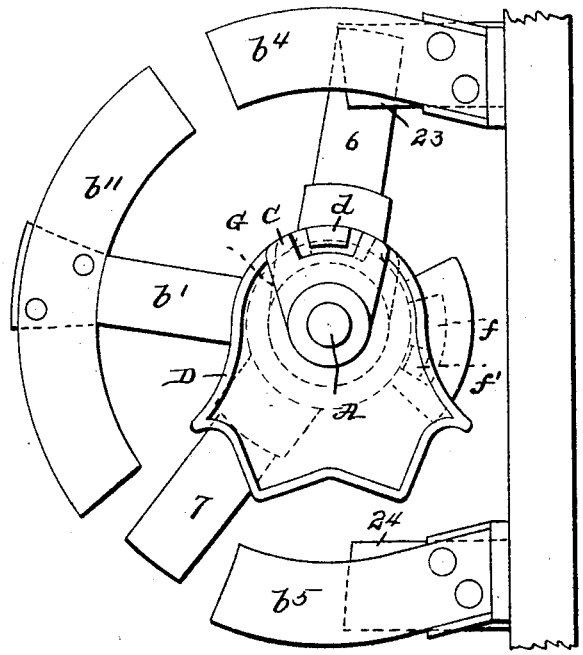

Figure 1 is an electric diagram of my switch mechanism. Fig. 2 is a front view. Fig. 3 is a plan view of the switches and controlling mechanism. Fig. 4 is a horizontal section of the same. Fig. 5 is a section on the line $w\,w$ of Fig. 4. Fig. 6 is a section on the line $x\,x$ of Fig. 4. Fig. 7 is a side elevation. Fig. 8 is a section taken in back of the fork, as on line $y\,y$, Fig. 4. Fig. 9 is a mechanical diagram with the switches closed in the upward position. Fig. 10 is a similar view with the operating-shaft moved in its central position opening the snap and leaving the reversing-switch closed.

A represents the switch-operating mechanism which in the embodiment of the invention herein shown is the operating-shaft. Loose upon this shaft is the hub B, to which are connected the blades $b\,b'$, carrying brushes $b^{10}$ and $b^{11}$, forming the snap-switch.

$b^2$ and $b^3$ are fingers with which the brush $b^{10}$, dependent upon the direction which said brush $b^{10}$ is moved, is adapted to contact.

$b^4$ and $b^5$ are fingers with which the brush $b^{11}$, dependent upon the direction it is moved, is adapted to contact.

At the rear of the portion of the hub carrying the blade $b$ is the blade 14, in contact with finger 15. Secured to the shaft A is the fork C.

D is a cam loose upon the shaft A.

$d$ is a lug upon the cam D, which rests in the fork C, with a certain amount of play between the lug and the walls of the fork, as is clearly shown in Figs. 9 and 10.

D' is a roller carried by the pivoted lever D². This roller D' is held against the surface of the cam D by means of the spring D³.

E is a fork connected with the hub B, this fork E being on the side of the cam D opposite to that of the fork C. Upon the cam D, on the side adjacent to the fork E, is the lug $e$, which rests in the fork E with a certain amount of play, as may be clearly seen in Fig. 2.

F is a sleeve upon the hub B, the hub B having an orifice $f$, into which a projecting lug $f'$ of the sleeve F enters and rests loosely. This lug limits the free movement of the sleeve upon the hub.

G is a sleeve also loose upon the hub B, there being upon the hub B a flange portion $g$, cut away at $g'$, into which a lug or projection $g^2$ on the sleeve G enters and within which it rests loosely.

The portions of the hub B carrying the blade $b$ and the sleeve G are insulated from each other and from the sleeve F and the portion of the hub carrying the blade $b'$. To the rear of the sleeve F is connected the blade $f^3$, which in all positions is in contact with the fingers $f^4$. To the sleeve F are attached blades 6 and 7, adapted in the movement of the switch to contact with brushes 23 and 24, respectively.

The sleeve G has a blade $g^3$, which in all positions of the switch is in contact with the fingers $g^4$ at the rear of the switch. To the sleeve G are attached brushes 8 and 9, which in the movement of the switch contact with brushes 25 and 26, respectively.

The electrical connections are made as follows: A wire connects fingers $b^2$ and $b^3$ with one pole of the source of current-supply, and from the other pole of current-supply electrical wire connection is made with the fingers $b^4$ and $b^5$. A wire connects the fingers 15 and the resistance-arm K.

Q is the field-resistance, and from this field-resistance a wire leads to one side of the field, and from the other side of the field a wire leads to the sleeve F by means of the brush $f^3$ and fingers $f^4$. From the armature-resistance $w$ a wire leads to the fingers $g^4$. A wire connects brushes 24 and 25 and a wire connects brushes 23 and 26.

When the switch is moved so as to break the connection of the blades $b$ and $b'$ with the source of current-supply, a closed circuit is still retained through the field and armature in the following manner: starting from one side of the field to fingers $f^4$, blade $f^3$, hub B, sleeve F, brushes 23 24 25 26, and blades 6, 7, 8, and 9, to armature and back to blade $g^3$ and fingers $g^4$, to armature-resistance M, to arm K, to field-resistance Q, to the other side of the field.

The operation of the switch is as follows: When the shaft A is turned, the fork C is turned, which, after the fork is moved sufficiently to contact with the lug $d$, moves the cam D, moving the roller up to the high point of the cam. When the roller is moved to the high point of the cam, the spring $D^3$ through the roller upon the cam will give it an accelerated movement, and the movement of the cam through the medium of the lug $e$ moves the fork E, which closes the snap-switch. The movement of the hub B through its connection with the sleeves G and F causes the blades 6 and 8 to connect with fingers 23 and 25 or blades 7 and 9 to connect with fingers 24 and 26. The loose connection between the sleeves F and G and hub B is such that blades $b$ and $b'$ and their brushes may be moved to cut off connection with the source of current-supply and still leave the blades 6 and 8 or 7 and 9 in connection with their respective fingers, as may be seen in Fig. 10. Thus a circuit in the fields is maintained which will prevent sparking. This will act with certainty in all cases except where the operating-bar is moved to reverse the motor. In this case the closed field-circuit would be broken, and a spark might result. Further, the arrangement of the blades of the armature-switch with reference to the snap-switch will in closing the switch cause the connection between the mains and the field to be made before connection is made between the main and the armature, which is a great benefit, the flash which would ordinarily occur in case of a sudden reversal thereby being greatly reduced. If it is deemed advisable to entirely prevent this flash, the following devices may be used: To the blade $b'$ is connected a brush J, and in line of movement of said brush J is the contact J', of sufficient length to maintain contact between itself and the brush J during the reversal of the switch and until the blades 6 and 8 or 7 and 9 again connect with their respective fingers, at which time the brush J is beyond the contact J'. A wire connects contact J' with field-resistance Q, and a closed field-circuit is made through the field by this contact J' and the hub B, fingers $f^4$, and blade $f^3$.

The construction of the operating device for the snap-switch enables the throw of the switch initially to be under the full control of the operator, but after starting will be accelerated through the roller and spring acting upon the cam C. The cam C, with its lugs and the forks, permits the switch to close with a snap, as well as open with a snap.

Having now fully described my invention, what I claim, and desire to protect by Letters Patent, is—

1. The combination with a source of current-supply and an electric motor, of a switch interposed between the source of current-supply and the motor, one portion of said switch being adapted to make electrical connection with the source of current-supply, the other portion being adapted to make electrical connection with the armature, and both portions of said switch being adapted to make electrical connection with the field, means to operate said switch to move the portion of the switch connecting with the current-supply to and from central position without moving the other portion of said switch.

2. The combination with a source of current-supply and an electric motor, of a switch interposed between the source of current-supply and the motor, one portion of said switch being adapted to make electrical connection with the source of current-supply, the other portion being adapted to make electrical connection with the armature, and both portions of said switch being adapted to make electrical connection with the field, the first-mentioned part of said switch being loosely connected to the last-mentioned part of the switch, so that the first-mentioned part has a movement to and from central position independent of the other part.

3. The combination with a source of current-supply and an electric motor, of a shaft, a switch interposed between said source of current-supply and the motor, consisting essentially of a hub upon said shaft, switch mechanism connected to said hub adapted in its movement to make and break connection with the source of current-supply, a cam having high and low points loose upon said shaft, forks between which said cam rests, one of said forks being secured to said shaft, the other to the said hub, connection between said cam and said forks, a roller resting upon said cam, and a spring or equivalent device acting upon said roller.

4. The combination with a source of current-supply and an electric motor, of a shaft, a switch interposed between said source of current-supply and the motor, consisting essentially of a hub upon said shaft, switch mechanism connected to said hub adapted in its movement to make and break connection with the source of current-supply, a cam having high and low points loose upon said shaft, forks between which said cam rests, one of said forks being secured to said shaft, the other to the said hub, loose connection between said cam and said forks, the connection between said cam and the shaft-fork being in the lead of the connection between said cam and the hub-shaft, a roller resting upon said cam, and a spring or equivalent device acting upon said roller.

5. In combination with a source of current-supply and an electric motor, of a switch interposed between the source of current-supply and the motor, consisting of two portions, one portion of which is loosely connected to the other portion, whereby the first-mentioned portion may be moved a predetermined distance independent of the other portion, the first-mentioned portion being adapted in its movement to make and break connection with the source of current-supply, the other portion being adapted in its movement to make and break and reverse the electric connection with the armature of the motor and electrical connection between the field and both portions of the switch.

6. In combination with a source of current-supply and an electric motor, a switch interposed between the source of current-supply and the motor consisting of two portions, one portion of which is loosely connected to the other portion, whereby the first-mentioned portion may be moved a predetermined distance independent of the other portion, the first-mentioned portion being adapted in its movement to make and break connection with the source of current-supply, the other portion being adapted in its movement to make and break and reverse electric connection with the armature of the motor, and electrical connection between the field and both portions of the switch, a shaft upon which said switch is loosely mounted, a hub upon said shaft to which the switch mechanism is connected, a cam having high and low points loose upon said shaft, forks between which said cam rests, one of said forks being secured to said shaft, the other to the said hub, connection between said cam and said forks, a roller resting upon said cam, and a spring or equivalent device acting upon said roller.

7. The combination with a source of current-supply and an electric motor, of a switch interposed between the source of current-supply and the motor consisting of two portions, one portion of which is loosely connected to the other portion, whereby the first-mentioned portion may be moved a predetermined distance independent of the other portion, the first-mentioned portion being adapted in its movement to make and break connection with the source of current-supply, the other portion being adapted in its movement to make and break the reverse electric connection with the armature of the motor, and electrical connection between the field and both portions of the switch, a hub to which said switch mechanism is connected, a shaft upon which said hub is loosely mounted, a cam having high and low points loose upon said shaft, forks between which said cam rests, one of said forks being secured to said shaft, the other to said hub, connection between said cam and said forks, the connection between said cam and the shaft-fork being in the lead of the connection between said cam and the hub-shaft, a roller resting upon said cam, and a spring or equivalent device acting upon said roller.

8. A source of current-supply, an electric motor, a switch consisting of two parts having a loose connection, one part controlling the connection of the source of current-supply and the field directly and the connection of the source of current-supply and the armature through the medium of the second part, the second part controlling the electrical connection with the armature, the first-mentioned part having a predetermined movement independent of the second part.

9. A switch for an electric device consisting essentially of two parts having a loose connection, a shaft upon which said switch is loosely mounted, a cam having high and low points loose upon said shaft, forks between which said cam rests, one of said forks being secured to said shaft, the other to one part of said switch, loose connection between said cam and said forks, a roller resting upon said cam, and a spring or equivalent device acting upon said roller.

10. A switch for an electric device consisting essentially of two parts having a loose connection, a shaft upon which said switch is loosely mounted, a cam having high and low points loose upon said shaft, forks between which said cam rests, one of said forks being secured to said shaft, the other to one part of said switch, loose connection between said cam and said forks, the connection between said cam and the shaft-fork being in the lead of the connection between said cam and the hub-shaft, a roller resting upon said cam, and a spring or equivalent device acting upon said roller.

11. In combination, a source of current-supply, a reversing-switch, an electric motor and electric connection between the source of current-supply and the field and armature of the motor, an electrical circuit including the field and armature of the motor through the reversing-switch, and means to make and break connection between the motor and source of current-supply and maintain a single circuit through the reversing-switch including the field and armature.

12. In combination, a source of current-supply, a reversing-switch, an electric motor and electric connection between the source of current-supply and the field and armature of the motor in shunt, an electrical circuit including the field and armature of the motor in series through the reversing-switch, and means to make and break connection between the motor and source of current-supply and maintain a single circuit through the reversing-switch including the field and armature.

13. The combination with a source of current-supply and an electric motor, of a shaft, an interposed switch consisting of a hub loose upon said shaft having two portions insulated from each other, sleeves as F and G upon and loosely connected to said hub, the sleeve F being in electrical connection with one portion of said hub, but insulated from the sleeve G, the sleeve G being insulated from the hub, blades as $b$ $b'$ connected with the hub, fingers or equivalent contact, as $b^2$ and $b^3$, in electrical connection with one pole of the source of current-supply, said fingers coacting with the blade $b$, fingers or equivalent contact, $b^4$, $b^5$, in electrical connection with the other pole of current-supply, said fingers coacting with the blade $b'$, a blade as 14 connected with the portion of the hub carrying the blade $b$, a finger 15 contacting with said blade, blades 6 and 7 connected to sleeve F, brushes 23 and 24 adapted to contact with blades 6 and 7 respectively, blade $f^3$ connected to said sleeve F, and finger $f^4$ contacting with said blade, brushes as 8 and 9 connected to said sleeve G, blade $g^3$ connected to said sleeve, and finger $g^4$ connecting with said blade $g^3$, electric connection between contact 15 and one side of the field and finger $g^4$ in shunt, electric connection between the other side of the field and finger $f^4$, electric connection between brushes 23 and 26, and brushes 24 and 25, and electrical connection between said brushes and the armature.

14. The combination with a source of current-supply and an electric motor, of a shaft, an interposed switch consisting of a hub loose upon said shaft having two portions insulated from each other, sleeves as F and G upon and loosely connected to said hub, the sleeve F being in electrical connection with one portion of said hub but insulated from the sleeve G, the sleeve G being insulated from the hub, blades as $b$ $b'$ connected with the hub, fingers or equivalent contact as $b^2$ and $b^3$ in electrical connection with one pole of the source of current-supply, said fingers coacting with the blade $b$, fingers or equivalent contacts as $b^4$ $b^5$ in electrical connection with the other pole of current-supply, said fingers coacting with the blade $b'$, a blade as 14 connected with the portion of hub carrying the blade $b$, a finger 15 contacting with said blade, blades 6 and 7 connected with sleeve F, brushes 23 and 24 adapted to contact with blades 6 and 7 respectively, blade $f^3$ connected to said sleeve F, and finger $f^4$ contacting with said blade, brushes as 8 and 9 connected to said sleeve G, blade $g^3$ connected to said sleeve, and finger $g^4$ connecting with said blade $g^3$, electric connection between contact 15 and one side of the field and finger $g^4$ in shunt, electric connection between the other side of the field and finger $f^4$, electric connection between brushes 23 and 26, and brushes 24 and 25, and electrical connection between said brushes and the armature, a cam having high and low points loose upon said shaft, forks between which said cam rests, one of said forks being secured to said shaft, the other to said hub, loose connection between said cam and said forks, a roller resting upon said cam, and a spring or equivalent device acting upon said roller.

15. The combination with a source of current-supply and an electric motor, of a shaft, an interposed switch consisting of a hub loose upon said shaft having two portions insulated from each other, sleeves as F and G upon and loosely connected to said hub, the sleeve F being in electrical connection with one portion of said hub but insulated from the sleeve G, the sleeve G being insulated from the hub, blades as $b$, $b'$ connected with the hub, fingers or equivalent contact as $b^2$ and $b^3$ in electrical connection with one pole of the source of current-supply, said fingers coacting with the blade $b$, fingers or equivalent contact as $b^4$ $b^5$ in electrical connection with the other pole of current-supply, said fingers coacting with the blade $b'$, a blade as 14 connected with the portion of hub carrying the blade $b$, a finger 15 contacting with said blade, blades 6 and 7 connected to sleeve F, brushes 23 and 24 adapted to contact with blades 6 and 7 respectively, blade $f^3$ connected to said sleeve F, and finger $f^4$ contacting with said blade, brushes as 8 and 9 connected to said sleeve G, and blade $g^3$ connected to said sleeve, and finger $g^4$ connecting with said blade $g^3$, electric connection between contact 15 and one side of the field and finger $g^4$ in shunt, electric connection between the other side of the field and finger $f^4$, electric connection between brushes 23 and 26, and brushes 24 and 25, and electrical connection between said brushes and the armature, a cam having high and low points loose upon said shaft, forks between which said cam rests, one of said forks being secured to said shaft, the other to said hub, loose connection between said cam and said forks, the connection between said cam and the shaft-fork being in the lead of the connection between said cam and the hub-shaft, a roller resting upon said cam, and a spring or equivalent device acting upon said roller.

16. In combination, a source of current-supply, an electric motor, an interposed switch controlling the admission of current from the source of supply to the motor, a brush carried by said switch in electrical connection with one side of said field, and a contact in electrical connection with the other side of the field, the contact being of length sufficient to maintain contact with the brush during the movement of said switch and break contact when the switch has closed connection between the source of current-supply and motor.

17. The combination with a source of current-supply and an electric motor, of switch-operating mechanism, a switch interposed between said source of supply and the motor, consisting of switch mechanism adapted in its movement to make and break connection with the source of current-supply, a cam having high and low points, a device pressed against said cam, means between the switch-operating mechanism and the cam whereby a movement of the switch-operating mechanism causes the high point of said cam to move against said device, a loose connection between said cam and the switch mechanism.

18. The combination with a source of current-supply and an electric motor, of a shaft, a switch interposed between said source of supply and the motor, consisting of a hub upon said shaft, switch mechanism connected to said hub adapted in its movement to make and break connection with the source of current-supply, a cam having high and low points loose upon said shaft, a tension device resting upon said cam, means between the shaft and the cam whereby a movement of the shaft will move the cam into position to be actuated by said tension device, and a loose connection between said cam and said hub.

19. The combination with a source of current-supply and an electric motor, of switch-operating mechanism, a switch interposed between said source of supply and the motor consisting of switch mechanism adapted in its movement to make and break connection with the source of supply, a cam having high and low points, a tension device resting against said cam, means between the switch-operating mechanism and the cam whereby a movement of the switch-operating mechanism will move the cam into position to be actuated by said tension device, and a loose connection between the cam and the switch mechanism whereby the cam when actuated will move a determinate distance before throwing the switch mechanism into action to make or break the circuit from the source of supply.

In testimony of which invention I have hereunto set my hand.

FRANK E. HERDMAN.

Witnesses:
  F. A. BUSCH,
  A. E. SMITH.